US012715751B2

(12) United States Patent
Dees et al.

(10) Patent No.: US 12,715,751 B2
(45) Date of Patent: Aug. 25, 2026

(54) BEVERAGE PREPARATION MACHINE AND COOLING MODULE

(71) Applicant: Koninklijke Douwe Egberts B.V., Utrecht (NL)

(72) Inventors: Hendrik Johan Dees, Utrecht (NL); Willem Plantinga, Utrecht (NL); Jacobus Dessing, Hoofddorp (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 784 days.

(21) Appl. No.: 18/021,793

(22) PCT Filed: Aug. 20, 2021

(86) PCT No.: PCT/EP2021/073188
§ 371 (c)(1),
(2) Date: Feb. 16, 2023

(87) PCT Pub. No.: WO2022/038283
PCT Pub. Date: Feb. 24, 2022

(65) Prior Publication Data

US 2023/0348254 A1 Nov. 2, 2023

(30) Foreign Application Priority Data

Aug. 21, 2020 (GB) ..................................... 2013050

(51) Int. Cl.
*B67D 1/08* (2006.01)
*A47J 31/46* (2006.01)
(Continued)

(52) U.S. Cl.
CPC .......... *B67D 1/0869* (2013.01); *A47J 31/461* (2018.08); *A47J 31/465* (2013.01); *A47J 31/468* (2018.08);
(Continued)

(58) Field of Classification Search
None
See application file for complete search history.

(56) References Cited

U.S. PATENT DOCUMENTS

2002/0162339 A1 11/2002 Harrison
2008/0282705 A1* 11/2008 Hue .................... F25D 31/007 165/104.34

(Continued)

FOREIGN PATENT DOCUMENTS

DE 202016107188 3/2017
GB 2304179 3/1997

(Continued)

OTHER PUBLICATIONS

KR 2013-0085669 A (Kim, Hae-yong et al.) Jul. 30, 2013 [retrieved on Nov. 29, 2025]. Retrieved from Foreign Image and Text database, translation by Clarivate Analytics. (Year: 2013).*

(Continued)

*Primary Examiner* — John J Norton
(74) *Attorney, Agent, or Firm* — Fitch, Even, Tabin & Flannery LLP

(57) ABSTRACT

A beverage preparation machine has a cooling module (70) for cooling a liquid beverage ingredient. The module comprises a heat exchanger (72) having a liquid conduit (74) and a thermal energy accumulator (80) comprising a phase change material (PCM) (82) thermally coupled to the heat exchanger. A heat pump (78) is thermally coupled to the heat exchanger discretely from the thermal energy accumulator so as to extract thermal energy from a liquid flowing through the liquid conduit in preference over the PCM. More than one thermal energy accumulator (80) may be coupled to the heat exchanger. The beverage preparation machine may have a flow-through heater for heating a liquid beverage ingredient.

22 Claims, 4 Drawing Sheets

(51) Int. Cl.

| | |
|---|---|
| ***A47J 31/52*** | (2006.01) |
| ***A47J 31/54*** | (2006.01) |
| ***F28D 17/00*** | (2006.01) |
| ***F28D 20/02*** | (2006.01) |

(52) U.S. Cl.

CPC ......... *A47J 31/469* (2018.08); *A47J 31/5253* (2018.08); *A47J 31/542* (2013.01); *B67D 1/0884* (2013.01); *F28D 17/00* (2013.01); *F28D 20/025* (2013.01); *A47J 2202/00* (2013.01)

(56) References Cited

U.S. PATENT DOCUMENTS

| | | | | |
|---|---|---|---|---|
| 2014/0360208 | A1* | 12/2014 | Sadot | F25D 31/002 62/3.3 |
| 2018/0099854 | A1 | 4/2018 | Jung | |
| 2018/0347870 | A1* | 12/2018 | Sonnenrein | F25B 21/02 |
| 2020/0217565 | A1 | 7/2020 | Boukai | |

FOREIGN PATENT DOCUMENTS

| | | | | | |
|---|---|---|---|---|---|
| JP | 200213859 | | | 1/2002 | |
| JP | 2013543783 | | | 12/2013 | |
| JP | 2002013859 | A | * | 1/2020 | |
| KR | 20130085669 | A | * | 7/2013 | B67D 1/0869 |
| WO | 2008139205 | | | 11/2008 | |
| WO | 2013088366 | | | 6/2013 | |
| WO | 2017112391 | | | 6/2017 | |

OTHER PUBLICATIONS

International Search Report and Written Opinion of the International Searching Authority mailed Dec. 3, 2021; International Application No. PCT/EP2021/073188 (10 pgs.).

Search Report under Section 17 dated Feb. 2, 2021; Application No. GB2013050.6 (1 pg.).

Korean Office Action dated Oct. 23, 2025, Korean Patent Application No. 10-2023-7009313, with English translation (17 pgs.).

* cited by examiner

BEVERAGE PREPARATION MACHINE AND COOLING MODULE

TECHNICAL FIELD OF THE INVENTION

The present invention relates to a beverage preparation machine capable of dispensing chilled beverages on demand. The present invention relates in particular, but not exclusively, to a beverage preparation machine capable of selectively dispensing chilled and/or hot beverages on demand. The invention also relates to a cooling module for a beverage preparation machine.

BACKGROUND TO THE INVENTION

There is an increasing demand for beverage preparation machines capable of dispensing a variety of beverages, including both hot and chilled beverages, on demand. It is known to use a variety of arrangements for heating a liquid to provide hot beverages such as a boiler or flow-through heater. Known arrangements for cooling a liquid to provide a chilled beverage include the use of a cooling compressor and heat exchanger. A particular issue with the known arrangements for heating and cooling liquids is the amount of spaced required, especially when combined into a single machine. With such machines becoming increasingly popular for use in self-service areas in hotels, restaurants and cafes, as well as in the home, there is an on-going demand to provide machines capable of delivering hot and chilled beverages which occupy as little space as possible.

It is an object of the present invention to provide an alternative beverage preparation machine which overcomes, or at least mitigates, some or all of the limitations of the known beverage preparation machines.

It is an object of the invention to provide a beverage preparation machine having a cooling arrangement for cooling a liquid which is more compact than known cooling arrangements.

It is a further object of the invention to provide a beverage preparation machine capable of dispensing both hot and cold beverages on demand which is compact and/or efficient.

SUMMARY OF THE INVENTION

Aspects of the invention relate to a beverage preparation machine and to a cooling module for a liquid beverage ingredient.

According to an aspect of the invention, there is provided a beverage preparation machine having an arrangement for cooling a liquid beverage ingredient, the cooling arrangement including at least one cooling module comprising a heat exchanger having a liquid conduit for a liquid beverage ingredient to be cooled, at least one thermal energy accumulator comprising a phase change material (PCM) thermally coupled (connected) to the heat exchanger, and a heat pump thermally coupled (connected) to the heat exchanger discretely from the at least one thermal energy accumulator and configured, in use, to extract thermal energy from a liquid beverage ingredient flowing through the liquid conduit in the heat exchanger and/or from the PCM in the at least one thermal energy accumulator.

In an embodiment, the arrangement is configured such that, in use, the heat pump extracts thermal energy preferentially from a liquid beverage ingredient in the liquid conduit over the PCM.

In an embodiment, the heat pump and the thermal energy accumulator are thermally coupled to the heat exchanger on opposite sides of the liquid conduit.

In an embodiment, the liquid conduit is located within the heat exchanger across a heat transfer path between the heat pump and the thermal energy accumulator.

In an embodiment, the thermal energy accumulator and the heat pump are thermally coupled to separate faces of the heat exchanger. The heat exchanger may define three or more faces, and the cooling arrangement may comprise at least two of said thermal energy accumulators, each thermal energy accumulator being thermally coupled to a different face of the heat exchanger. The heat exchanger may have four planar faces, the heat pump being thermally coupled to one of said planar faces. The heat exchanger may be configured to enable a respective thermal energy accumulator to be coupled to each of said remaining three planar faces. The heat exchanger may be shaped as a rectangular annulus in cross-section having four internal faces and four external faces, the heat pump being coupled to at least one of said internal faces and said at least one thermal energy accumulator being coupled to an external face. At least one additional thermal energy accumulator may be mountable to a further of the external faces.

In an embodiment, the beverage preparation machine comprises a control system including a sensor for monitoring the temperature of the heat exchanger, the control system being configured to deactivate the heat pump if the temperature of the heat exchanger falls to or below a first threshold value and to only permit the heat pump to be re-activated once the temperature of the heat exchanger is at or above a second threshold value higher than the first. The first threshold temperature may be in the region of 0.5° C.

In an embodiment, the heat exchanger comprises a metallic body within which the fluid conduit is embedded, the thermal coupling between the heat exchanger and the at least one thermal energy accumulator comprising a plurality of fins projecting from the body and immersed in the PCM material. The heat exchanger may comprise two metallic plates, the fluid conduit being clamped between said plates. The body and/or the fins may be aluminium or aluminium alloy.

In an embodiment, the fluid conduit comprises at least one stainless-steel tube. The fluid conduit may have an internal diameter in the region of 1.5 to 3 mm, more preferably in the region of 2.1 mm.

In an embodiment, the cooling arrangement comprises two or more cooling modules whose liquid conduits are fluidly connected series.

In an embodiment, the beverage preparation machine further comprises a flow-through heater for heating a liquid beverage ingredient. In an embodiment, the beverage preparation machine has a reservoir for holding a liquid beverage ingredient for use in producing a hot beverage, the reservoir being fluidly coupled to the flow-through heater such that in use, liquid beverage ingredient is drawn from the reservoir and passed through the flow-through heater for use in making a hot beverage. The beverage preparation machine may have a control system configured to monitor the temperature of the liquid beverage ingredient in the reservoir and to maintain the liquid beverage ingredient in the reservoir at a temperature at or above a minimum threshold temperature. The arrangement may be configured to maintain the liquid beverage ingredient in the reservoir at a temperature in the region of in the region of 55 to 65° C. and more particularly at a temperature of about 60° C. The liquid beverage ingredient may be water and the reservoir may be fluidly connected with a source of cold water.

According to another aspect of the invention, there is provided a cooling module for cooling a liquid beverage ingredient, the module comprising a heat exchanger having a liquid conduit for a liquid beverage ingredient to be cooled, at least one thermal energy accumulator comprising a phase change material (PCM) thermally coupled to the heat exchanger, and a heat pump thermally coupled to the heat exchanger discretely from the at least one thermal energy accumulator and configured, in use, to extract thermal energy from a liquid beverage ingredient flowing through the liquid conduit in the heat exchanger and from the PCM in the at least one thermal energy accumulator.

In an embodiment, more than one said thermal energy accumulator is thermally coupled to the heat exchanger.

In an embodiment, the, or each, thermal energy accumulator and the heat pump are thermally coupled to separate faces of the heat exchanger.

In an embodiment, the heat exchanger defines three or more faces, the module comprising at least two of said thermal energy accumulators, each thermal energy accumulator being thermally coupled to a different face of the heat exchanger.

In an embodiment, the heat exchanger defines three or more faces, the heat pump being thermally coupled to one of said faces of the heat exchanger and at least a first thermal energy accumulator being coupled to a second face of the heat exchanger, the heat exchanger being configured so that at least one additional thermal energy accumulator can be selectively coupled to a further face of the heat exchanger.

According to a still further aspect of the invention, there is provided a modular cooling module for cooling a liquid beverage ingredient, the module comprising a heat exchanger having a liquid conduit for a liquid beverage ingredient to be cooled, at least one thermal energy accumulator comprising a phase change material (PCM) thermally coupled to the heat exchanger, and a heat pump thermally coupled to the heat exchanger discretely from the at least one thermal energy accumulator and configured, in use, to extract thermal energy from a liquid beverage ingredient flowing through the liquid conduit in the heat exchanger and from the PCM in the at least one thermal energy accumulator, wherein the module is configured such that at least one additional thermal energy accumulator comprising PCM can be selectively coupled to the heat exchanger.

DETAILED DESCRIPTION OF THE INVENTION

In order that the invention may be more clearly understood one or more embodiments thereof will now be described, by way of example only, with reference to the accompanying drawings, of which:

Figures 1, 2:
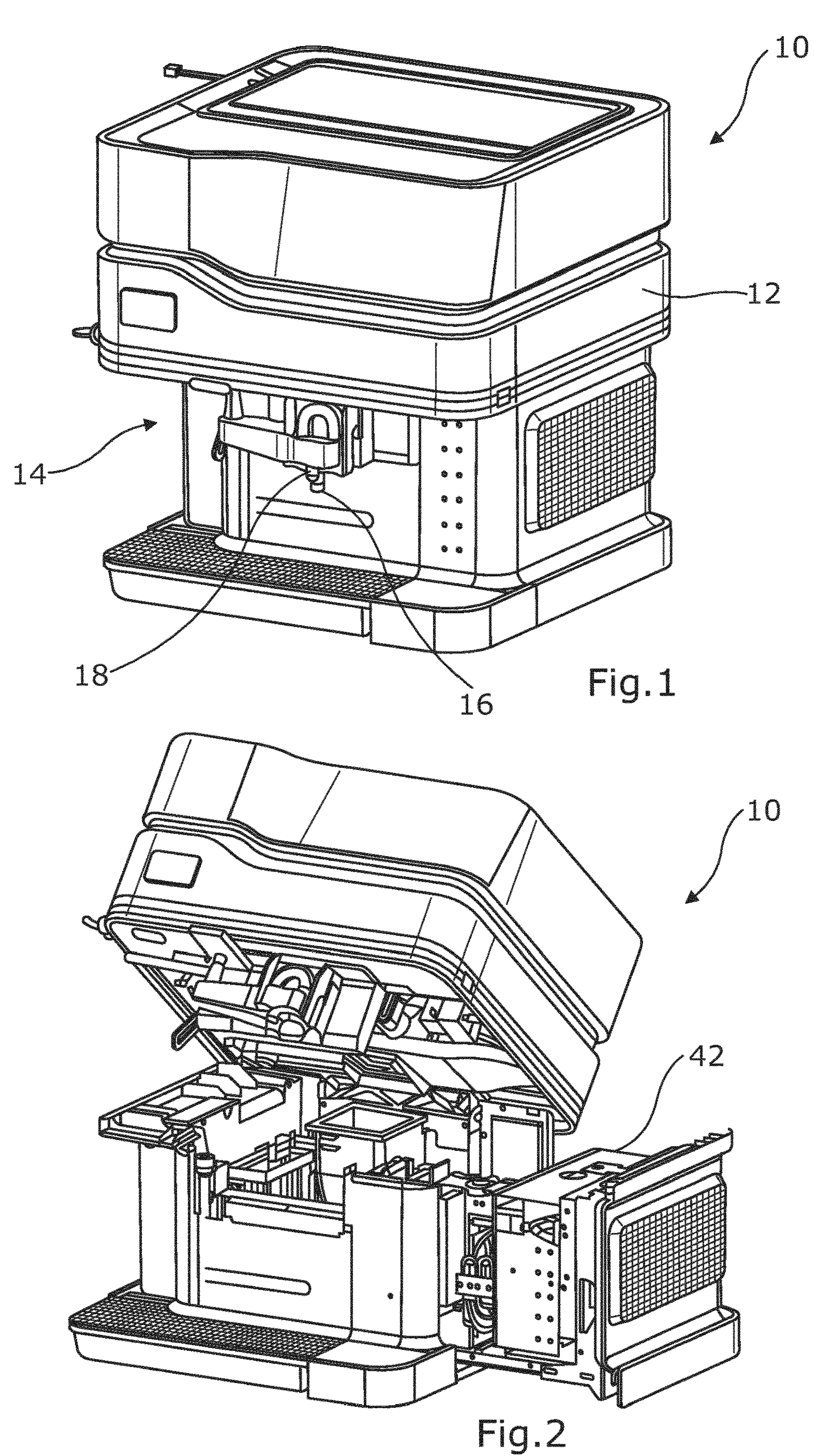
FIG. 1 is a perspective view of an embodiment of a beverage preparation machine according to an aspect of the invention.
FIG. 2 is a perspective and partially exploded view of the beverage preparation machine of FIG. 1.

An embodiment of a beverage preparation machine 10 in accordance with an aspect of the invention is illustrated in FIGS. 1 and 2. The beverage preparation machine 10 according to this embodiment is adapted for dispensing both hot and chilled beverages on demand, including coffee, milk, coffee and milk combinations, and tea.

The beverage preparation machine has an outer casing 12 within which many of the functional components are located and has a dispensing outlet module 14 accessible at the front of the machine to a user. The dispensing outlet module has two main beverage outlets 16, 18 for dispensing flavoured beverages and a separate water outlet 20 for dispensing water which can be used, for example, in brewing tea in a container externally of the machine. The water outlet is not visible in FIGS. 1 and 2 but forms part of the dispensing outlet module 14.

Figure 3:
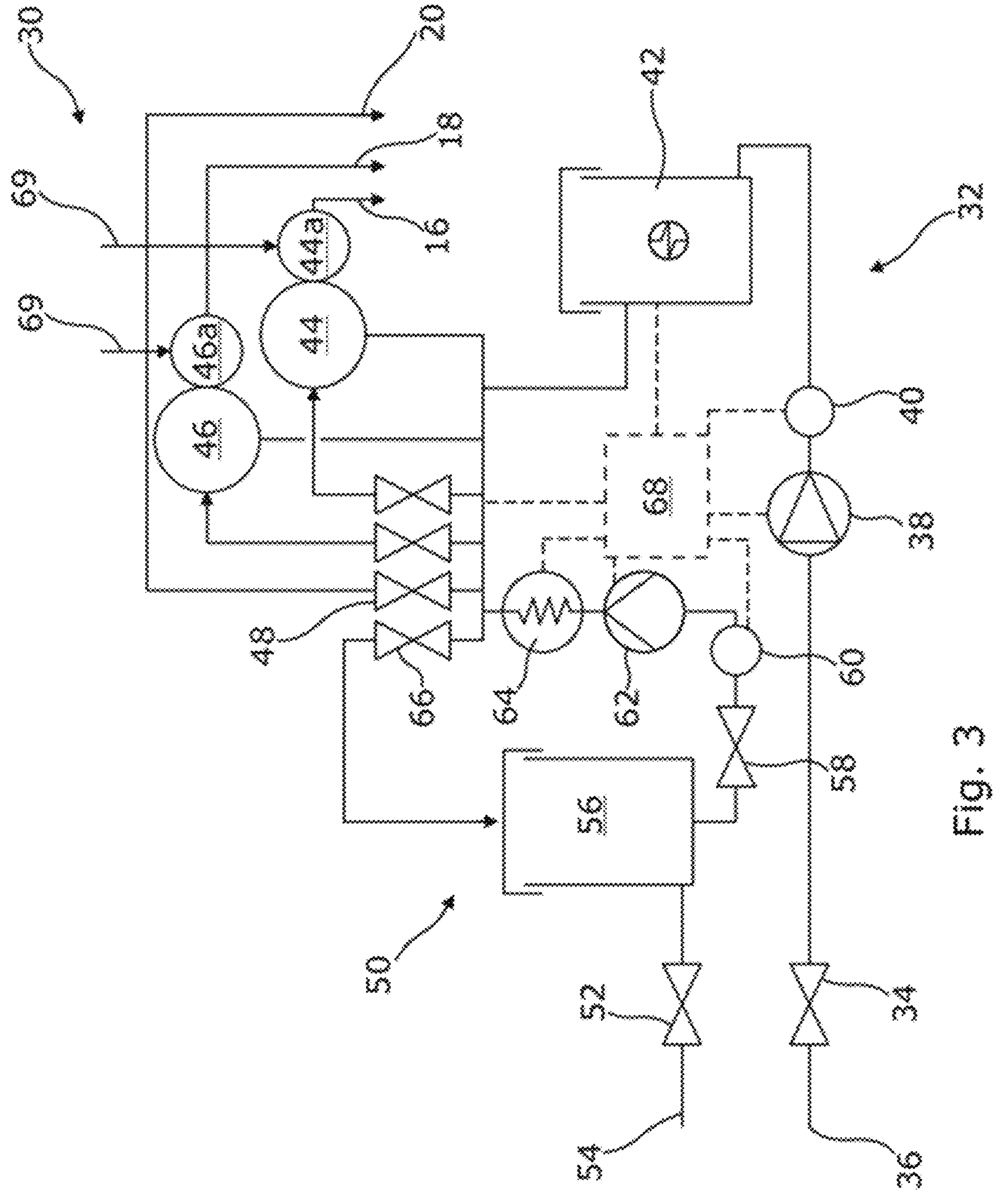
FIG. 3 is a schematic diagram of part of a hydraulic system of the beverage preparation machine of FIGS. 1 and 2.

Part of a hydraulic system 30 of the beverage preparation machine 10 is illustrated schematically in FIG. 3.

The hydraulic system 30 includes a chilled-liquid supply circuit 32 for chilling a liquid beverage ingredient. In the present embodiment as described below, the chilled-liquid supply circuit is adapted to chill water but the arrangement could be modified to chill other liquid beverage ingredients. The chilled-liquid supply circuit includes a first inlet valve 34 connected to a cold-water supply 36, a cold-water pump 38, a flow meter 40, and a cooling unit 42. Water is pumped through the chilled-liquid supply circuit 32 on demand by the pump 38 with the first inlet valve 34 open and, where a chilled-beverage is required, is cooled as it passes through the cooling unit 42. From the cooling unit 42, water can be selectively directed to either or both of the main beverage outlets 16, 18 by operation of respective ceramic valves 44 and 46 and/or to the water outlet 20 by operation of a water dispensing outlet valve 48.

The hydraulic system 30 also includes a hot-liquid supply circuit 50 for heating a liquid beverage ingredient. In the present embodiment as described below, the hot liquid supply circuit is adapted to heat water but the arrangement could be modified to heat other liquid beverage ingredients. The hot-liquid supply circuit 50 includes a second inlet valve 52 connected to a cold-water supply 54, a hot-water buffer reservoir 56, a reservoir outlet valve 58, a flow meter 60, a hot-water pump 62, and a flow-through heater 64.

The hot-water buffer reservoir 56 is used to store a volume of water which has been pre-heated for use in making hot beverages. Water is supplied to the buffer reservoir 56 as required from the cold-water supply 54 via the second inlet valve 52. To pre-heat the water, it is pumped through the flow-through heater 64 and back to the reservoir 56 via a valve 66.

The beverage preparation machine 10 has a control system, indicated schematically at 68. The control system 68 is configured to control and regulate the flow of water and other ingredients through the hydraulic system 30 in accordance with predefined algorithms by operation of the hot and cold water pumps, valves, the cooling unit 42 and the flow-through heater 64. The control system 68 includes a programable electronic controller with a processor and memory. The control system also includes various sensors for monitoring parameters of the hydraulic circuit, including the flow meters 40, 60 and a sensor arrangement for monitoring the temperature of the water in the reservoir 56. The control system 68 is operative to circulate water from the reservoir 56 through the flow-through heater 64 and back into the reservoir 56 as required to maintain the water in the reservoir at a desired temperature, within limits. Typically, the water in the reservoir 56 is maintained at a temperature in the region of 55 to 65° C. and more particularly at a temperature of about 60° C.

In use when hot water is required for a beverage to be dispensed, water is pumped on demand from the hot-water buffer reservoir 56 through the flow-through heater 64 where its temperature is further raised. From the flow-through heater 64, the hot water can be selectively directed to either or both of the main beverage outlets 16, 18 by operation of respective ceramic valves 44 and 46 and/or to the water outlet 20 by operation of the water outlet valve 48.

Many hot beverages will require water at a temperature greater than 75° C. and some require water at or close to boiling. Heating water direct from a cold-water supply to these temperatures would require a very high-power flow-through heater 62. However, by using a buffer reservoir 56 in which water is pre-heated, a lower power flow-through heater 64 can be used to supply hot water at the temperatures required.

Water supplied from the chilled-liquid circuit 32 and/or the hot-liquid circuit 50 is generally mixed with one or more other beverage ingredients such as coffee, milk, chocolate and the like (as indicated by arrows 69) prior to being dispensed through the main beverage dispensing outlets 16, 18. This mixing takes place in a waterjet mixer 44*a*, 46*a* downstream from the respective ceramic valve 44, 46. However, as this is not a key feature of the present invention, details will not be described further. It should be appreciated that other arrangements for mixing the heated and/or chilled water with beverage ingredients can be adopted.

It will be noted from FIG. 3, the chilled-liquid circuit 32 and the hot liquid supply circuit 50 are combined downstream of the cooling unit 42 and the flow-through heater 64 so that water from the two circuits can be mixed prior to delivery to any of the dispensing outlets 16, 18, 20. This enables greater control over the temperature of the beverage/water being dispensed. Use of a flow-through heater and the ability to mix water from the hot and cold supply circuits 32, 50 enables water to be supplied at a temperature which is just right for a given beverage. For example, different tea varieties may require hot water at different temperatures, e.g. white tea 71° C., green tea 100° C., Oolong 88° C., and Darjeeling 82° C.

Figure 4:
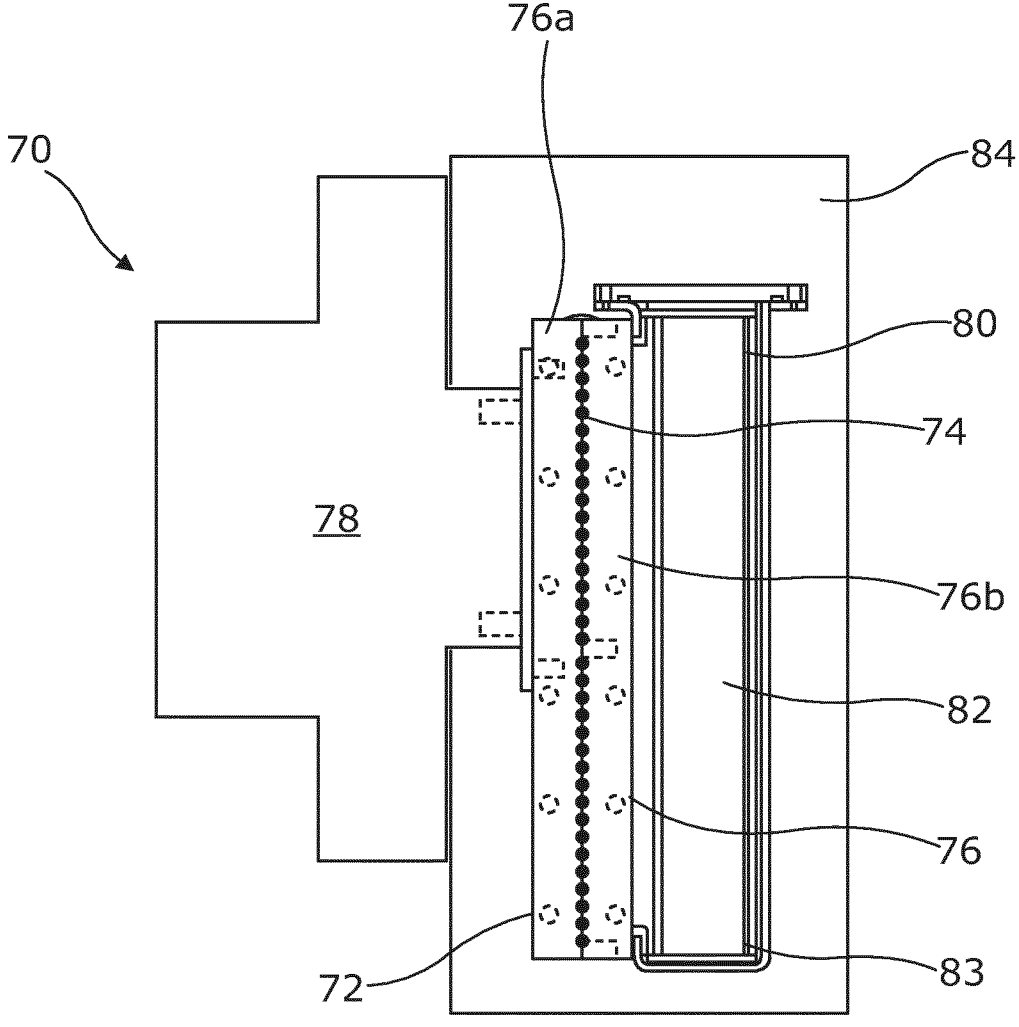
FIG. 4 is a schematic representation of an embodiment of a cooling module for cooling a liquid beverage ingredient according to an aspect of the invention and which is suitable for use in the beverage preparation machine of FIGS. 1 and 2.

The cooling unit 42 includes at least one cooling module 70, an embodiment of which is illustrated schematically in FIG. 4. The cooling module 70 has a heat exchanger 72 having a liquid conduit 74 for a liquid beverage ingredient, usually water. The heat exchanger has a metallic body 76 formed by two plates or blocks 76*a*, 76*b*, between which the fluid conduit 74 is sandwiched. The plates 76*a*, 76*b* have a significant volume of metallic material and act has heat sinks. In an embodiment, the body is made of aluminium (which could be an alloy) and the plates 76*a*, 76*b* may be bolted or otherwise secured together. The liquid conduit 74 forms a tortuous path between the aluminium plates 76*a*, 76*b* and is in good thermal contact with the plates. The liquid conduit 74 can be made from any suitable materials but the applicant has found that use of a stainless-steel tube having an internal diameter in the region of 1.5 to 3 mmm, more especially in the region of 2.1 mm, is particularly advantageous. However, the size of the liquid conduit can be selected according to the requirements of any particular application and it can be made of different materials, provided it complies with relevant safety standards, e.g. food safety standards.

Thermally coupled to one of the aluminium plates 76*a* is a heat pump 78. The heat pump 78 is operative in use to extract thermal energy from water passing through liquid conduit 74 in order to cool the water for use in preparing a chilled beverage. The heat pump 78 in this embodiment is a thermoelectric heat pump such as a Peltier heat pump. However, any suitable heat pump can be used.

Thermally coupled with the other of the aluminium plates 76*b* on the opposite side of the liquid conduit 74 from the heat pump 78 is a thermal energy accumulator 80 containing a phase change material (PCM) 82. To provide a good thermal contact between the heat exchanger 72 and the PCM, a large number of thin aluminium fins 83 project from the plate 76*b* into the interior of the thermal energy accumulator and are surrounded by the PCM 82. The heat pump 78 is thermally coupled to the thermal energy accumulator 80 through the heat exchanger, principally through the aluminium plates 76*a*, 76*b*, and in use is operative to extract thermal energy from the PCM 82 so that the PCM can be used as a buffer of cooling energy to assist in cooling water passing through the liquid conduit 74. In this regard, the thermal energy accumulator can be considered as a negative thermal energy store or as a cold store as the thermal energy in the PCM is generally less than that of the water passing through the heat exchanger.

Insulating material 84 is provided surrounding the exposed surfaces of the thermal energy accumulator 80 and the heat exchanger 72.

Prior to dispensing a chilled beverage, the heat pump 78 is operative to extract thermal energy from the PCM 82 so that the thermal energy accumulator 80 is charged with negative thermal energy (cold). When chilled water is required for dispensing, water from the cold-water supply 36 is pumped on demand through liquid conduit 74 the heat exchanger 72. As the water passes through the conduit 74 in the heat exchanger 72, the heat pump 78 is operative to extract thermal energy from water reducing its temperature. Since the thermal energy stored in the PCM 82 is negative compared to the thermal energy in the water passing through the heat exchanger, the PCM will also extract thermal energy from the water as it passes through the heat exchanger, helping to reduce its temperature. The PCM 82 thus supplements the heat pump 78 in reducing the temperature of the water as it passes through the heat exchanger 72, providing a more uniform cooling effect.

After chilled water has been dispensed, the heat pump 78 is actuated under control of the control system 68 to extract thermal energy from the PCM to re-charge the thermal energy accumulator 80 with negative thermal energy (cold). To ensure that water in the heat exchanger 72 does not freeze when the PCM is being charged and the water in the heat exchanger is not flowing, the control system monitors the temperature of the heat exchanger 72 and stops the heat pump 78 if the temperature in the heat exchanger falls to or below a first threshold value below which ice might form, say around 0.5° C. The control system only allows the heat pump 78 to reactivate when the temperature in the heat exchanger reaches a higher threshold value, say around 2° C.

Any suitable PCM 82 can be used. Preferably the PCM should have a specific heat capacity which is significantly higher than aluminium or whichever material is used to form the body of the heat exchanger. The body of the heat exchanger functions like a heat sink to absorb thermal energy from the liquid in the liquid conduit. The PCM also acts like a heat sink but since it has a higher specific heat capacity a smaller volume of PCM is required to absorb a similar amount of thermal energy in comparison to the aluminium body. Use of a PCM buffer then reduces the space requirement for a cooling module to produce a given cooling effect in comparison to a cooling module with no PCM thermal energy storage. A suitable PCM material will preferably have a specific heat capacity which is at least 3 times, and more preferably at least 4 times, higher than aluminium. This would enable the space requirement for the cooling module to be reduce by a factor of 3 to 4. An example of a suitable PCM is RUBITHERM® RT, available from Rubitherm Technologies GmbH, Imhoffweg 6, D-12307 Berlin.

Figure 5:
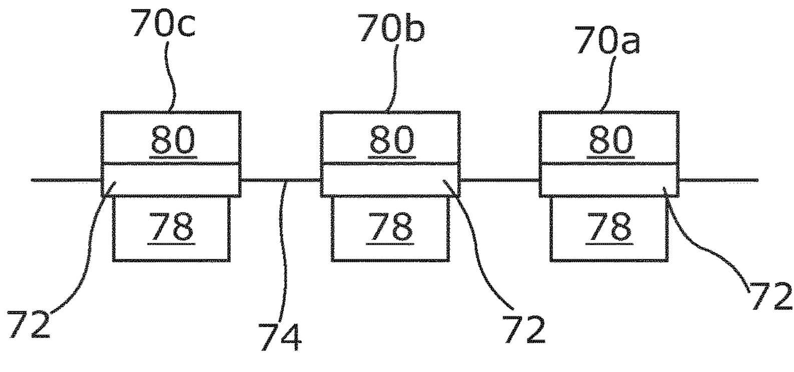
FIG. 5 illustrates schematically a number of cooling modules such as that shown in FIG. 4 connected in series for use in a beverage preparation machine.

The cooling module 70 is configured such that the heat pump 78 preferentially draws thermal energy from water passing through the conduit 74 in the heat exchanger 72 over the PCM 82 in the thermal energy accumulator 80. This has been found to be particularly energy efficient. In this regard, it will be noted that the heat pump 78 and the thermal energy accumulator 80 are coupled to the aluminium body 76 of the heat exchanger on opposite sides of the liquid conduit 74. Looked at another way, the liquid conduit 74 is located within the heat exchanger in the thermal path between the heat pump 78 and the thermal energy accumulator 80.

Where necessary to provide a required cooling effect, the cooling unit 42 may have more than one cooling module 70 arranged in series as illustrated schematically in FIG. 5, which shows three modules 70*a*, 70*b*, 70*c* whose liquid conduits 74 are connected in series. In such an embodiment, water can be passed sequentially through two or more cooling modules 70 to achieve the required level of cooling.

Alternatively, or in addition, in order to increase cooling capacity, each cooling module 70 may be provided with more than one thermal energy accumulator 80 containing a phase change material (PCM) 82 thermally coupled to the heat exchanger 72. This is illustrated schematically in FIGS. 6 and 7.

Figure 6:
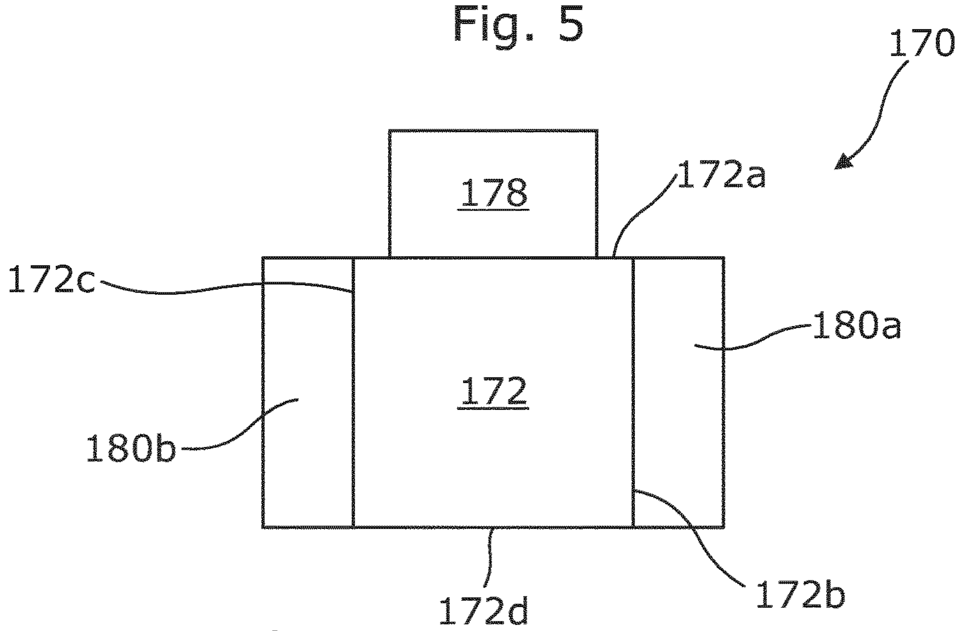
FIG. 6 is a schematic representation of an alternative embodiment of a cooling module for cooling a liquid beverage ingredient according to an aspect of the invention and which is suitable for use in the beverage preparation machine of FIGS. 1 and 2.

In FIG. 6, the cooling module 170 has a heat exchanger 172 with four planar faces 172*a*, 172*b*, 172*c*, 172*d*. The heat pump 178 is thermally coupled to a first face 172*a* of the heat exchanger, a first thermal energy accumulator 180*a* is thermally coupled at a second face 172*b* of the heat exchanger, and a second thermal energy accumulator 180*b* is thermally coupled at a third face 172*c* of the heat exchanger. If required, a third thermal energy accumulator could be thermally coupled to the fourth face 172*d* of the heat exchanger. Each thermal energy accumulator contains PCM 82 and adding additional thermal energy accumulators increases the cooling capacity of the module 70.

Figure 7:
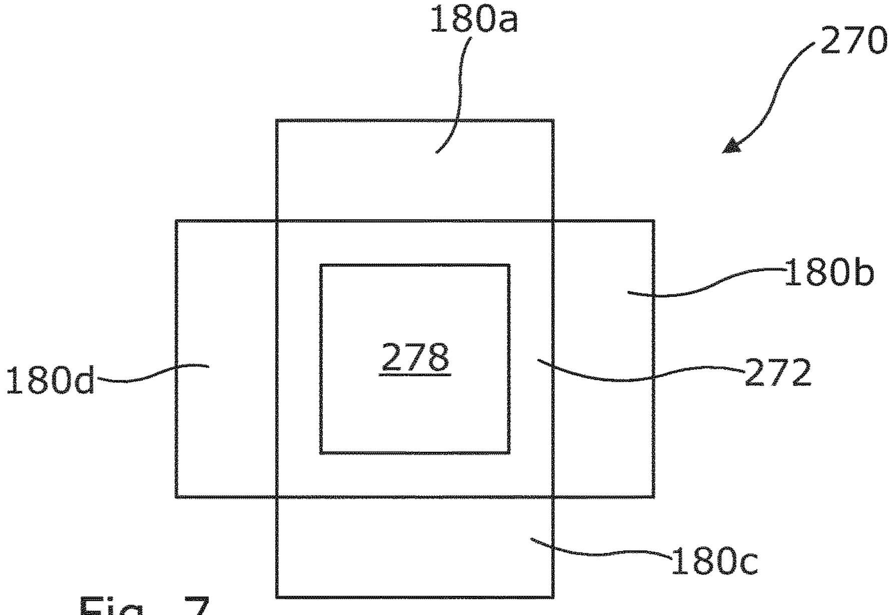
FIG. 7 is a schematic representation of yet another alternative embodiment of a cooling module for cooling a liquid beverage ingredient according to an aspect of the invention and which is suitable for use in the beverage preparation machine of FIGS. 1 and 2.

FIG. 7 illustrates an alternative embodiment of a cooling module 270 in which the heat exchanger 272 is in the shape of a rectangular (in this case square) annulus in cross section, having four internal planer faces and four external planer faces. The heat pump 278 is thermally coupled to one or more of the internal faces of the heat exchanger 272 whilst up to four thermal energy accumulators 180*a*-180*d* can each be thermally coupled to a respective one of the external faces.

The cooling module 70, 170, 270 is thus easily expandable by connecting more PCM thermal accumulators 80, 180, 280 to the heat exchanger 72, 172, 272 where required for greater cooling capacity. Indeed, the cooling module can be modularised by providing a heat exchanger 72, 172, 272 which is adapted to have a variable number of thermal energy accumulators 80, 180, 280 connected to it depending on the cooling requirements to be met. For example, with a heat exchanger 172 having four planar faces, up to three thermal energy accumulators could be coupled to the heat exchanger depending on the cooling requirements. Thus, such a heat exchanger could be used in cooling modules requiring one, two or three thermal energy accumulators. This would enable the same basic heat exchanger design to be adopted for use in beverage preparation machines with different cooling requirements by simply varying the number of thermal energy accumulators connected to it. The use of a common heat exchanger in different machines with different cooling requirements will lead to a saving in costs. In many cases a common heat pump can be used, in which case the heat pump and heat exchanger can be provided as a common sub-assembly for use in different machines. A modular heat exchanger and/or sub-assembly may be provided with mounting arrangements for selectively coupling at least two thermal energy accumulators to the heat exchanger.

The use of a PCM thermal energy accumulator 80, 180, 280 reduces the space requirement for a cooling module in a beverage preparation machine. The use of a flow-through heater 64 also reduces the space requirement in a beverage preparation machine in comparison to the use of a boiler for producing hot water. By combining these features, it has been found that a beverage machine capable of dispensing both hot and chilled drinks can be provided which has a footprint the same as, or similar to, that of current machines with no water-cooling module. Furthermore, the combination enables greater control over the temperature of beverages/water being dispensed.

The one or more embodiments are described above by way of example only. Many variations are possible without departing from the scope of protection afforded by the appended claims. For example, the construction of the heat exchanger can vary from that described. The liquid conduit can be integrated into a thermally conductive body made of aluminium or any other suitable material in any suitable manner.

The invention claimed is:

1. A cooling module for cooling a liquid beverage ingredient, the module comprising a heat exchanger having a liquid conduit for a liquid beverage ingredient to be cooled, at least one thermal energy accumulator comprising a phase change material (PCM) thermally coupled to the heat exchanger, and a heat pump thermally coupled to the heat exchanger discretely from the at least one thermal energy accumulator and configured, in use, to extract thermal energy from a liquid beverage ingredient flowing through the liquid conduit in the heat exchanger and from the PCM in the at least one thermal energy accumulator.

2. A cooling module as claimed in claim 1, wherein more than one said thermal energy accumulator is thermally coupled to the heat exchanger.

3. A cooling module as claimed in claim 1, wherein the, or each, thermal energy accumulator and the heat pump are thermally coupled to separate faces of the heat exchanger.

4. A cooling module as claimed in claim 1, wherein the heat exchanger defines three or more faces, the heat pump being thermally coupled to one of said faces of the heat exchanger and at least a first thermal energy accumulator being coupled to a second face of the heat exchanger, the heat exchanger being configured so that at least one additional thermal energy accumulator can be selectively coupled to a further face of the heat exchanger.

5. A beverage preparation machine having an arrangement for cooling a liquid beverage ingredient, the cooling arrangement including at least one cooling module according to claim 1.

6. A beverage preparation machine as claimed in claim 5, wherein the heat pump and the thermal energy accumulator are thermally coupled to the heat exchanger on opposite sides of the liquid conduit.

7. A beverage preparation machine as claimed in claim 5, wherein the liquid conduit is located within the heat exchanger across a heat transfer path between the heat pump and the thermal energy accumulator.

8. A beverage preparation machine as claimed in claim 5, wherein the thermal energy accumulator and the heat pump are thermally coupled to separate faces of the heat exchanger.

9. A beverage preparation machine as claimed in claim 8, wherein the heat exchanger defines three or more faces, the module comprising at least two of said thermal energy accumulators, each thermal energy accumulator being thermally coupled to a different face of the heat exchanger.

10. A beverage preparation machine as claimed in claim 5, wherein the beverage preparation machine comprises a control system including a sensor for monitoring the temperature of the heat exchanger, the control system being configured to deactivate the heat pump if the temperature of the heat exchanger falls to or below a first threshold value and to only permit the heat pump to be re-activated once the temperature of the heat exchanger is at or above a second threshold value higher than the first threshold value.

11. A beverage preparation machine as claimed in claim 5, wherein the heat exchanger comprises a metallic body within which the liquid conduit is embedded, the thermal coupling between the heat exchanger and the at least one thermal energy accumulator comprising a plurality of fins projecting from the body and immersed in the PCM.

12. A beverage preparation machine as claimed in claim 5, wherein the liquid conduit comprises at least one stainless steel tube.

13. A beverage preparation machine as claimed in claim 5, wherein the liquid conduit has an internal diameter between 1.5 to 3 mm.

14. A beverage preparation machine as claimed in claim 5, wherein the cooling arrangement comprises two or more cooling modules whose liquid conduits are fluidly connected in series.

15. A beverage preparation machine as claimed in claim 5, the beverage preparation machine further comprising a flow-through heater for heating a liquid beverage ingredient.

16. A beverage preparation machine as claimed in claim 15, configured to combine liquid from the cooling module and the flow-through heater downstream of the cooling module and flow-through heater prior to delivery to a dispensing outlet.

17. A beverage preparation machine as claimed in claim 15, comprising a liquid beverage ingredient storage reservoir for holding liquid beverage ingredient for use in producing a hot beverage, the arrangement being configured such that, in use, liquid beverage ingredient is passed through the flow-through heater and heated for storage in the reservoir.

18. A beverage preparation machine as claimed in claim 17, wherein the beverage preparation machine has a control system configured to monitor the temperature of the liquid beverage ingredient in the reservoir and to maintain the liquid beverage ingredient in the reservoir at a temperature at or above a minimum threshold temperature.

19. A beverage preparation machine as claimed in claim 18, wherein the arrangement is configured such that, for use in preparing a hot beverage for dispensing, liquid beverage ingredient is extracted from the liquid beverage ingredient storage reservoir and passed through the flow-through heater to be heated.

20. A beverage preparation machine as claimed in claim 19, further comprising a hot liquid supply circuit comprising: a hot liquid supply circuit inlet valve connected to a cold-water supply, the reservoir, a reservoir outlet valve, a hot-water pump, and the flow-through heater.

21. A beverage preparation machine as claimed in claim 19, further comprising a chilled-liquid supply circuit comprising a chilled-liquid supply circuit inlet valve connected to a cold-water supply, a cold-water pump and the cooling module.

22. A modular cooling module for cooling a liquid beverage ingredient, the module comprising a heat exchanger having a liquid conduit for a liquid beverage ingredient to be cooled, at least one thermal energy accumulator comprising a phase change material (PCM) thermally coupled to the heat exchanger, and a heat pump thermally coupled to the heat exchanger discretely from the at least one thermal energy accumulator and configured, in use, to extract thermal energy from a liquid beverage ingredient flowing through the liquid conduit in the heat exchanger and from the PCM in the at least one thermal energy accumulator, wherein the module is configured such that at least one additional thermal energy accumulator comprising PCM can be selectively coupled to the heat exchanger.

* * * * *